United States Patent
Carney

(10) Patent No.: US 7,353,277 B1
(45) Date of Patent: Apr. 1, 2008

(54) DYNAMIC LOAD BALANCING OF VIDEO REQUESTS

(75) Inventor: Stephen Carney, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1554 days.

(21) Appl. No.: 09/712,101

(22) Filed: Nov. 14, 2000

(51) Int. Cl.
*G06F 15/16* (2006.01)
*G06F 15/173* (2006.01)

(52) U.S. Cl. .................. 709/226; 709/224; 709/228; 709/235; 709/239

(58) Field of Classification Search ............... 709/218, 709/223, 224, 226, 229, 228, 235, 239
See application file for complete search history.

(56) References Cited

U.S. PATENT DOCUMENTS

| | | | | |
|---|---|---|---|---|
| 5,684,963 A * | 11/1997 | Clement | ........ | 705/26 |
| 6,014,701 A * | 1/2000 | Chaddha | ........ | 709/226 |
| 6,112,239 A * | 8/2000 | Kenner et al. | ........ | 709/223 |
| 6,185,619 B1 * | 2/2001 | Joffe et al. | ........ | 709/229 |
| 6,360,262 B1 * | 3/2002 | Guenthner et al. | ........ | 709/226 |
| 6,412,004 B1 * | 6/2002 | Chen et al. | ........ | 709/226 |
| 6,529,950 B1 * | 3/2003 | Lumelsky et al. | ........ | 709/218 |
| 6,606,643 B1 * | 8/2003 | Emens et al. | ........ | 709/224 |

* cited by examiner

Primary Examiner—Quang N. Nguyen

(57) ABSTRACT

A distributed streaming media server system including a plurality of streaming media servers that each store a selection of multimedia files. A master streaming media server is communicatively coupled to the plurality of streaming media servers and compiles mapping information regarding a location of each of the multimedia files that are stored on each of the plurality of streaming media servers. Also included in the system is at least one streaming media client that requests access to a multimedia file through the master streaming media server. The streaming media client receives setup information regarding the requested multimedia file such that the at least one streaming media client may directly access the multimedia file from one of the plurality of streaming media servers. Various aspects of the present invention may also be found in a method by which a distributed streaming media server system having a plurality of streaming media servers, a master streaming media server, and at least one streaming media client provides a media presentation to a user. The method, not necessarily in this order, includes receiving a user request for a media file at the at least one streaming media client; forwarding the user request to the master streaming media server; analyzing the user request with the master streaming media server to determine which of the plurality of streaming media servers is appropriate for sending the media file of the user request; establishing a streaming media connection between the at least one server media client and one of the plurality of streaming media servers; and initiating transmission of a media stream that includes the media file from the one of the plurality of streaming media servers to the at least one streaming media clients.

1 Claim, 6 Drawing Sheets

DYNAMIC LOAD BALANCING OF VIDEO REQUESTS

BACKGROUND

1. Field of the Invention

The present invention relates to a multimedia transmission system, in particular to a video transmission system that provides the ability for a user to request, via a master video server, a video that is stored on at least one video server.

2. Description of the Related Art

In the field of computer technology, "video files" are computerized data objects comprising sequential moving images that, when displayed or "played," are similar in nature to the images produced by movie and television technology. Likewise, "audio files" are computerized data objects comprising sequential sound that, when played, are similar in nature to sound recordings of music, voice, or other content. When video and audio files are combined, the result is sometimes referred to as a "video" file or more generically as a "media" file. Of course, this type of file is also referred to as a multimedia file. Media files are computerized data objects comprising both sequential moving images (video) and sequential sound (audio), and may include additional elements such as sequential text or non-sequential data for corresponding or separate use with the media content.

In a traditional file transfer between two computer systems, the receiving computer system cannot utilize the transferred file until the entire file has been received. With large computer files, this transfer process may take considerable time, thereby creating a delay between the time the file transfer is requested and when the file can actually be used. However, streaming media technology provides a solution to this problem through "streaming media files" that are systematically transferred via a continuous stream that allows the inherently-sequential elements of the media file to be played as it is received. Consequently, while streaming media files are usually sent from prerecorded computerized video files, they can also be transferred as a live broadcast feed where the media files' source signals are converted into the media file format and immediately transferred, thereby entirely eliminating the traditional notions of the "beginning" or "end" in regard to live broadcast media files.

Video servers commonly store the video files that are streamed to a requesting computer system. As technology progresses, the video files (media files) continue to grow larger and larger. A particular video server is limited in the number of different media files that it may store and bandwidth may become a problem when there is more than one requesting computer system for the same media file.

Many other problems and disadvantages of the prior art will become apparent to one skilled in the art after comparing such prior art with the present invention as described herein.

SUMMARY OF THE INVENTION

Various aspects of the present invention may be realized through a distributed streaming media server system. The system includes a plurality of streaming media servers that each store a selection of multimedia files. A master streaming media server is communicatively coupled to the plurality of streaming media servers and compiles mapping information regarding a location of each of the multimedia files that are stored on each of the plurality of streaming media servers. Also included in the system is at least one streaming media client that requests access to a multimedia file through the master streaming media server. The streaming media client receives setup information regarding the requested multimedia file such that the at least one streaming media client may directly access the multimedia file from one of the plurality of streaming media servers.

In certain embodiments, the multimedia files of the distributed streaming media server system may be video files. Whether the media file is video or not, the at least one streaming media client may receive the setup information from the master streaming media server or from one of the plurality of streaming media servers. Of note, the request for access to the multimedia file by the at least one streaming media client may be multiplexed. The master streaming media server of the distributed streaming media server system often considers load balancing when determining which of the plurality of streaming media servers to select for access by the at least one streaming media client.

In one embodiment, the master streaming media server of the distributed streaming media server system includes a socket thread, a request queue, and request threads to transmit information between the at least one streaming media client and the plurality of streaming media servers. In addition, the master streaming media server may include a load poll thread, a load average queue, and load average threads to determine the load balancing among the plurality of streaming media servers. The master streaming media server may also select one of the plurality of streaming media servers to access for the requested multimedia file and redirect the requesting client to exchange information directly with the one of the plurality of streaming media servers. In addition, the master streaming media server may utilize a logical content database that is queried by the master streaming media server to identify which of the plurality of streaming media servers possesses a specific streaming media file that fulfills a request for the specific streaming media file originating from the at least one streaming media client.

Other variations of the distributed streaming media server system may involve the at least one streaming media client, the master streaming media server, and one of the plurality of streaming media servers utilizing a connectionless and stateless communications protocol between the at least one streaming media client and the master streaming media server, between the master streaming media server and the one of the plurality of streaming media servers, and between the one of the plurality of the streaming media servers and the at least one streaming media client. The connectionless and stateless communications protocol may be integrated directly into the master streaming media server, the one of the plurality of streaming media servers, and the at least one streaming media client.

Various aspects of the present invention may also be found in a method by which a distributed streaming media server system having a plurality of streaming media servers, a master streaming media server, and at least one streaming media client provides a media presentation to a user. The method, not necessarily in this order, includes receiving a user request for a media file at the at least one streaming media client; forwarding the user request to the master streaming media server; analyzing the user request with the master streaming media server to determine which of the plurality of streaming media servers is appropriate for sending the media file of the user request; establishing a streaming media connection between the at least one server media client and one of the plurality of streaming media servers; and initiating transmission of a media stream that includes the media file from the one of the plurality of streaming media servers to the at least one streaming media client.

In some embodiments, analyzing the user request involves scanning a table to determine which of the plurality of streaming media servers contains the requested media file. The method could also include contacting one of the streaming media servers to determine its operational status or examining bandwidth history of the plurality of streaming media servers.

It is also contemplated that analyzing the user request may include determining which of the plurality of streaming media servers are equipped to fulfill the request for the media file. In some cases, establishing the streaming media connection involves passing a redirect to the at least one streaming media client.

Still other aspects of the present invention may be realized through a network system for accessing selected streaming video files. The system includes a network having a master streaming video server communicatively coupled to a plurality of streaming video servers. The plurality of streaming video servers each stores at least one video file that is configured to operate as a streaming video file. A processor is included that is communicatively coupled to the network and that receives instructions from a user to access a particular video file. The instructions are passed to the master streaming video server for analysis. The master streaming video server is configured to determine which, if any, of the plurality of streaming video servers stores the particular video file. The master streaming video server of the network system may include load balancing capabilities to select one of the plurality of streaming video servers having a preferred bandwidth to stream the particular video file.

Other aspects of the present invention will become apparent with further reference to the drawings and specification which follow.

BRIEF DESCRIPTION OF THE DRAWINGS

A better understanding of the present invention can be obtained when the following detailed description of the drawings is considered in conjunction with the following drawings.

DETAILED DESCRIPTION OF THE DRAWINGS

Figure 1:
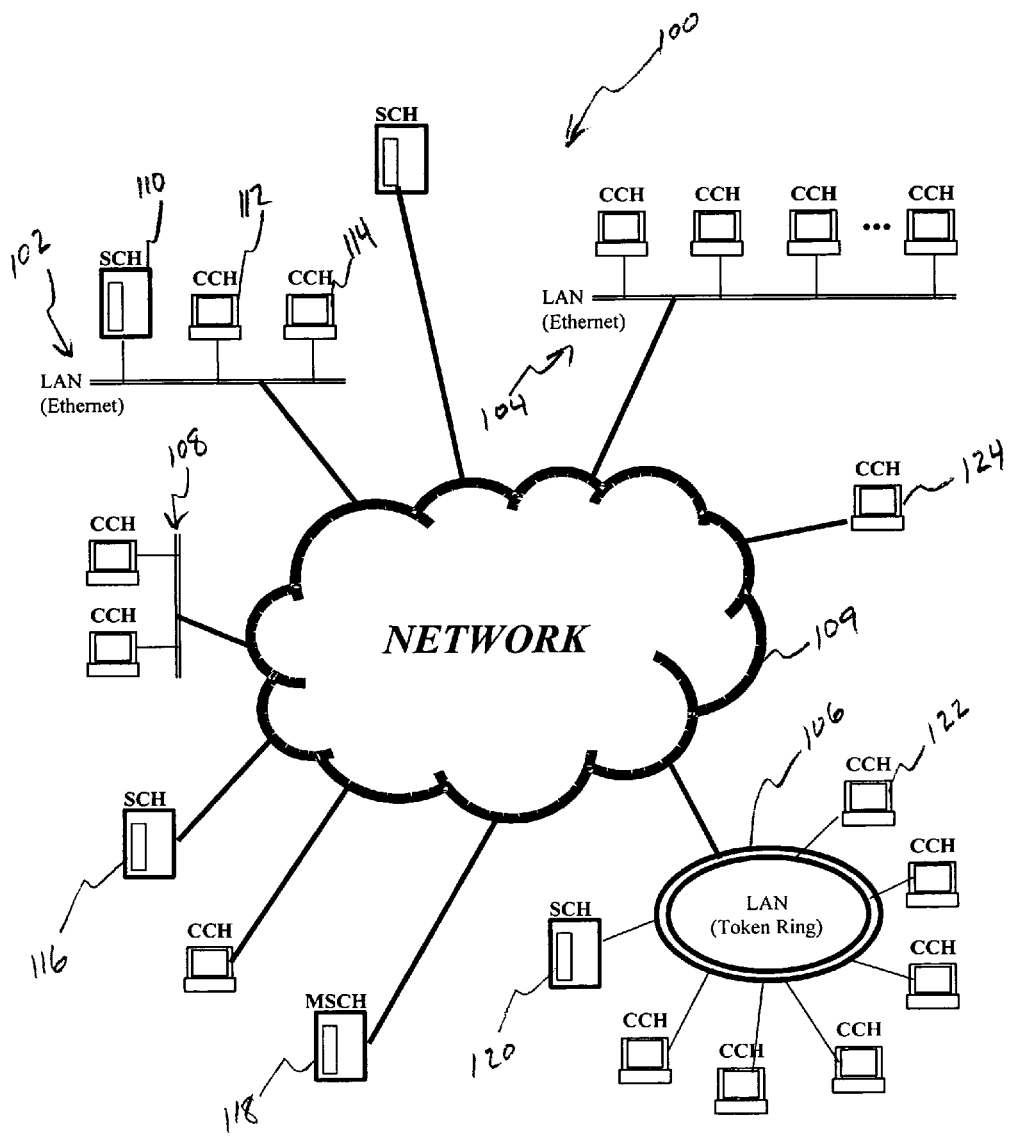
FIG. 1 is a network diagram of an exemplary load balancing system wherein client computer hardware (CCH) is illustrated interacting with server computer hardware (SCH) according to principles of the present invention wherein various local area networks (LANs) are integrated into the load balancing system.

FIG. 1 is a network diagram 100 of an exemplary load balancing system wherein client computer hardware (CCH) is illustrated interacting with server computer hardware (SCH) according to principles of the present invention wherein various local area networks (LANs) are integrated into the load balancing system. Ethernet LANs 102 and 104, a token ring LAN 106, and another LAN 108 are each illustrated interacting via a network 109. The network 109 is a network such as a wide area network (WAN), a global area network (GAN), another LAN, etc.

The Ethernet LAN 102 includes SCH 110, CCH 112, and CCH 114. In operation, a user choosing to view a media file may enter a request at the CCH 112 to view the media file. The CCH 112 sends the request for the media file to the SCH 110. A streaming connection is then established between the SCH 110 and the CCH 112 across the Ethernet LAN 102. A similar operation could occur between the CCH 114 and the SCH 110.

When a request for a media file is made from the CCH 112, the media file does not necessarily have to be located at the SCH 110. For example, the media file may be located at SCH 116. When the media file is located at the SCH 116, the network 109 must be accessed to retrieve the media file from the SCH 116 for the CCH 112. The CCH 112 is not required to know the particular SCH upon which the media file is located. In other words, a user may enter a request for a media file at the CCH 112 and the CCH 112 sends the request for the media file to an SCH which is the master server computer hardware (MSCH), e.g., MSCH 118. The MSCH 118 contains a table of the locations of all the media files in all the SCHs in the network 100. When the MSCH 118 determines which SCH is appropriate to use for streaming the media file to the CCH 112, the MSCH 118 either passes that information back to the CCH 112 where the CCH 112 directly requests the media file from the particular SCH indicated by the MSCH 118, or the MSCH 118 serves as an intermediary to establish the streaming media connection. In this manner a streaming connection may be established between the CCH 112 and a particular SCH.

For example, at the CCH 112, a user could enter a request for a media file and the CCH 112 would access information from the MSCH 118. The MSCH 118 determines the appropriate SCH for the CCH 112 to establish a streaming media connection and sends setup information to the CCH 112. The CCH 112 is then informed of the location of the media file, e.g., on the SCH 116. The CCH 112 then establishes a streaming media connection between the CCH 112 and the SCH 116.

The token ring LAN 106 may include an SCH 120 as well as a number of CCHs, e.g. CCH 122. The CCH 122 could be used to request a media file and the MSCH 118, once notified by the CCH 122, then looks to its table to determine where, among many SCHs of the network 109, the appropriate media file is located. The media file could be located at one or more SCHs. If only one media file exists on one of the SCHs, the MSCH 118 need only determine which one. However, when the media file exists on more than one SCH or more than one copy of the media file exists on a single SCH, or any combination thereof, other factors, such as load balancing, are considered by the MSCH 118 to determine the appropriate SCH for the CCH 112 to access, e.g., the appropriate media file could be located on the SCH 110. In this case, the streaming media connection passes from the SCH 110 of the Ethernet LAN 102, across the network 109, and to the CCH 122 of the token ring LAN 106.

In another embodiment, a CCH 124 is a stand-alone computer system with the MSCH 118 directing the CCH 124 to access a media file from an SCH located on the Ethernet LAN 102. Of course, an MSCH could be located on the Ethernet LAN 102 or 104, the token ring LAN 106, or other position on the distributed streaming media server system of the network diagram 100. As will be understood by those of ordinary skill in the art and viewing the present disclosure, numerous variations exist for the CCH to obtain media files from one of the SCHs.

Figure 2:
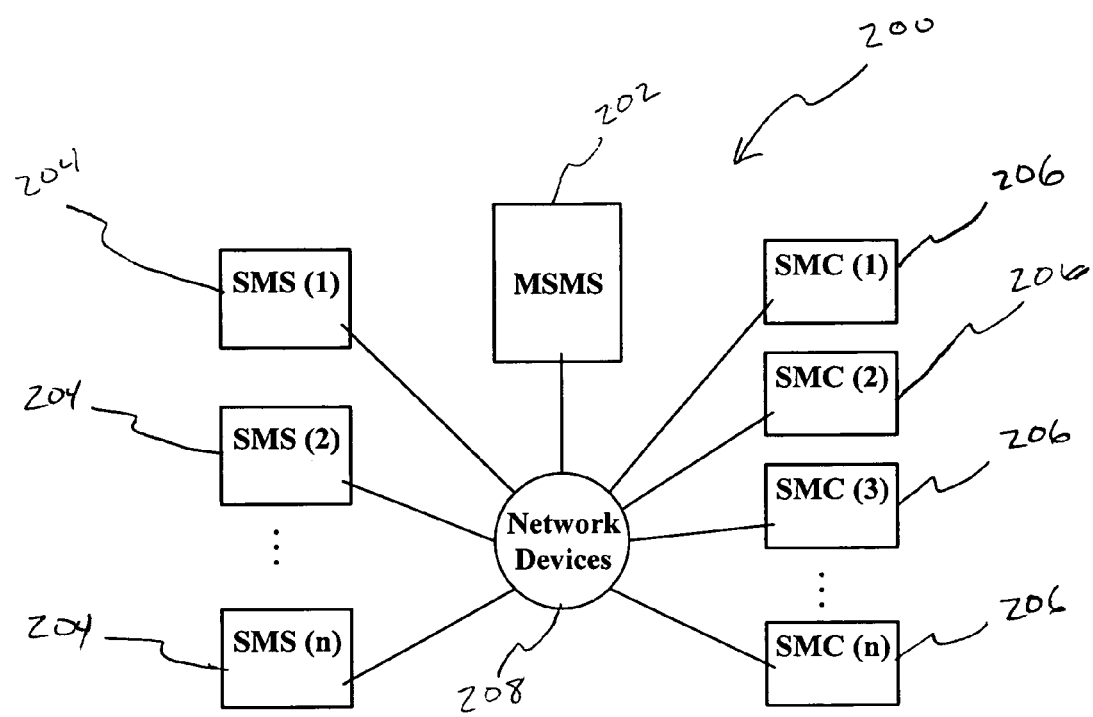
FIG. 2 is a block diagram of an exemplary load balancing system having a master streaming media server (MSMS) interacting according to principles of the present invention with streaming media servers (SMSs) and streaming media clients (SMCs) via network devices.

FIG. 2 is a block diagram of an exemplary load balancing system 200 having a master streaming media server (MSMS) 202 interacting according to principles of the present invention with streaming media server (SMSs) 204, individually labeled SMS (1), SMS(2), . . . , SMS(n), and streaming media clients (SMCs) 206, individually labeled SMC(1), SMC(2), SMC(3), . . . SMC(n), the SMSs 204 and the SMCs 206 interacting via network devices 208. Similar to the operations described in relation to the network diagram 100, a user may enter a request for a media file through one of the SMCs 206. The selected SMC accesses the MSMS 202 via the network devices 208. In one embodiment, the MSMS 202 locates an acceptable SMS of the SMSs 204 that contains the requested media file. Setup information for the streaming media connection is then sent to the SMC 206 that requested access to the media file, e.g., the setup information is sent to the SMC 206 from the SMS 204, from the MSMS 202, etc. A streaming media connection is then established between the requesting SMC 206 and the SMS 204 that the MSMS 202 determines should be contacted for the media file. Among other potential factors to consider, the MSMS 202 considers the location of the SMS 204 holding the media file as well as the load balancing on the system 200.

Figure 3:
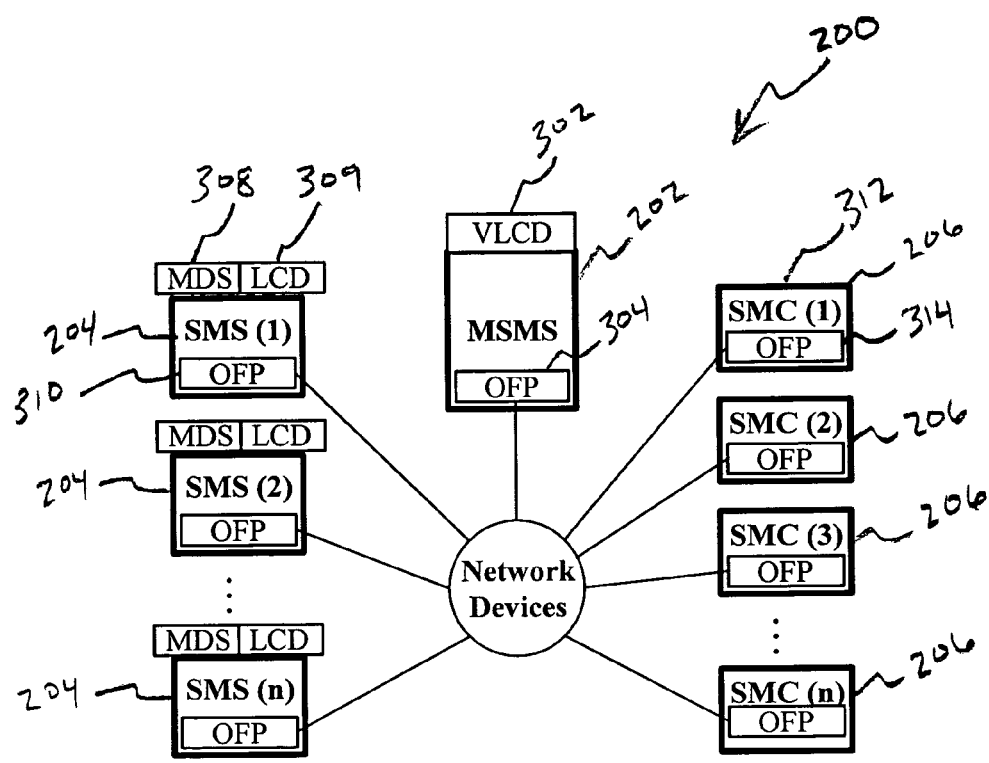
FIG. 3 is a block diagram of the load balancing system of FIG. 2 illustrated in greater detail.

FIG. 3 is a block diagram of the load balancing system 200 illustrated in greater detail than in FIG. 2. For example, the MSMS 202 is illustrated as having a virtual logical-content database (VLCD) 302 and an ORB (Object Request Broker) free protocol module (OFP) 304. The streaming media servers (SMSs) 204 also contain greater detail. For example, SMS(1) includes a media data store (MDS) 308, a logical content database (LCD) 309, and operates with an OFP 310. The SMCs 206, such as SMC(1), also operate with an OFP 314. Of course, other variations of the hardware are contemplated to establish the master streaming media server connection between the streaming media clients and streaming media servers.

Figure 4:
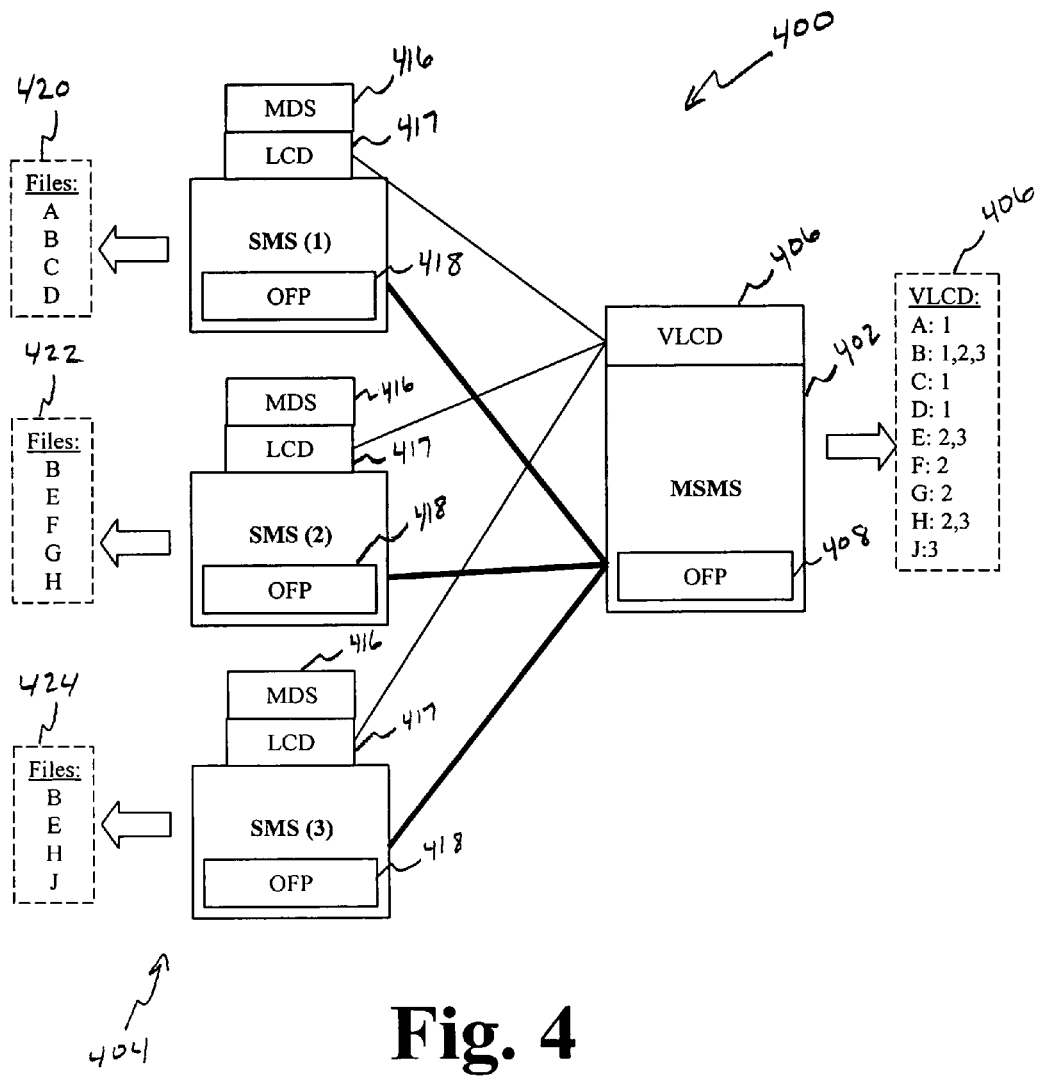
FIG. 4 is a block diagram illustrating an exemplary configuration of a portion of a load balancing system wherein a master streaming media server (MSMS) and streaming media servers (SMSs) are illustrated.

FIG. 4 is a block diagram illustrating an exemplary configuration of a portion of a load balancing system 400 wherein an MSMS 402 and SMSs 404, individually labeled SMS(1), SMS(2), and SMS(3), are illustrated. The MSMS 402 includes a VLCD 406 and operates with an OFP protocol 408. The SMSs 404 each include an MDS 416, an LCD 417, and operate using an OFP 418. Different media files are stored at each of the SMSs 404. The LCD 417 of each SMS 404 provides a table of files for quick determination of the files that are available at the particular SMS. For example, SMS(1) may include the files A, B, C, and D 420, SMS(2) may include the files B, E, F, G, and H 422, and SMS(3) may include the files B, E, H, and J 424.

The MSMS 402 processes a request for a file using the VLCD 406. For example, the VLCD 406 transparently accesses the LCDs 417 to determine the location(s) of the requested media file. In this manner, the MSMS 402 receives a request from a streaming media client (not pictured) and is able to immediately determine which SMS stores the requested media file. If the media file is located on more than one SMS, the MSMS 402, among other things, determines which SMS has the most desirable load for streaming the media file to the requesting SMC.

In one embodiment, the SMC may request the media file B. The MSMS 402 looks to the VLCD 406 and determines that B is located at SMS(1), SMS(2), and SMS(3). The MSMS 402 then determines which of the SMSs 404 are operational and looks at the bandwidth history of the SMSs 404 and the currently available bandwidth of the SMSs 404. The SMS with the greatest available bandwidth is selected to accommodate the desired load balancing of the system 400.

Figure 5:
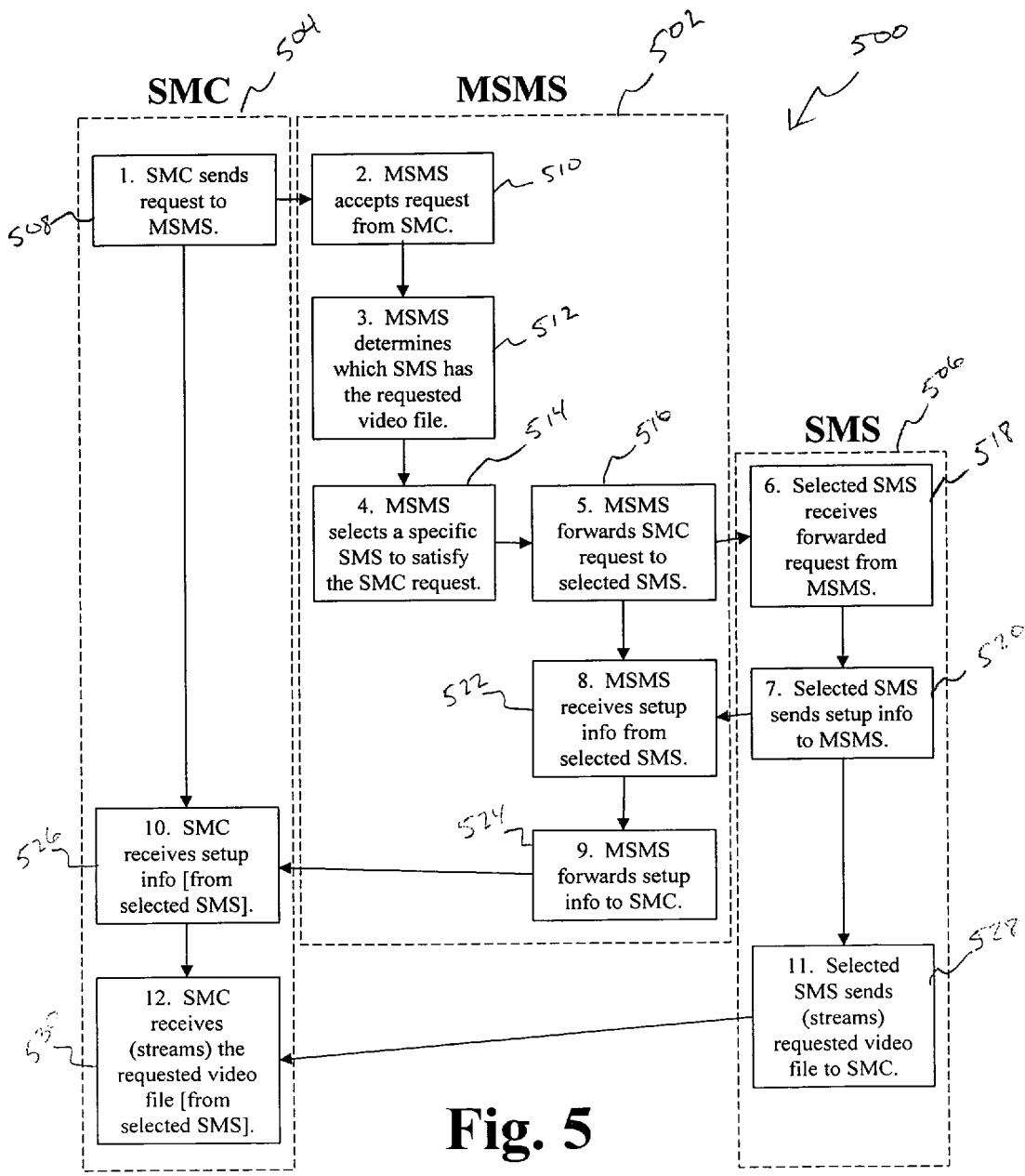
FIG. 5 is a flow diagram of exemplary command interactions in the load balancing system of FIG. 2.

FIG. 5 is a flow diagram 500 of exemplary command interactions in the load balancing system 200. The flow diagram 500 includes an MSMS 502, an SMC 504, and an SMS 506. In a first step 508 of the flow diagram 500, the SMC 504 sends a request for a video file to the MSMS 502. At step 510, the MSMS 502 accepts the request from the SMC 504. At step 512, the MSMS 502 determines which SMS has the requested video file. If multiple SMSs have the requested video file, the MSMS 502 considers factors such as load balancing to select, at step 514, a specific SMS to satisfy the SMC 504 request. At step 516, the MSMS 502 forwards the SMC 504 request to the selected SMS. At step 518, the selected SMS receives the forwarded request from the MSMS 502. At step 520, the selected SMS sends its setup information to the MSMS 502.

At step 522, the MSMS 502 receives the setup information from the selected SMS and, at step 524, the MSMS 502 forwards the setup information to the SMC 504. At step 526, the SMC receives the setup information from the selected SMS and, at step 528, the selected SMS sends or streams the requested video file to the SMC 504. At step 530, the SMC 504 receives or streams the requested video file from the selected SMS.

Figure 6:
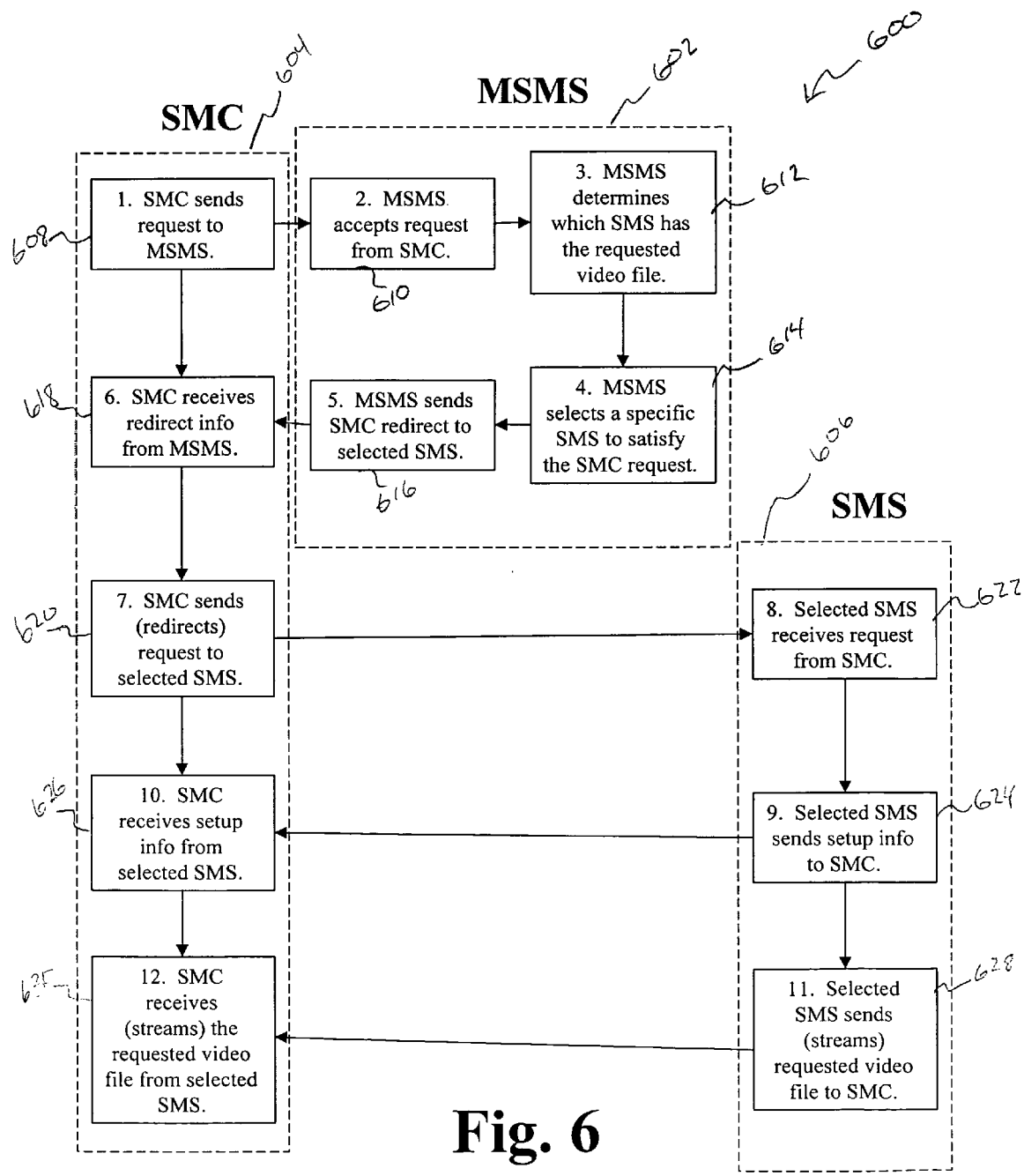
FIG. 6 is another flow diagram of exemplary command interactions in the load balancing system of FIG. 2.

FIG. 6 is another flow diagram 600 of exemplary command interactions in the load balancing system 200. For ease of understanding, the flow diagram 600 is divided into three separate modules representing the MSMS 602, the SMC 604, and the SMS 606. However, upon description of the steps of the flow diagram, the labels for each of these portions of the load balancing system will not be referenced.

At a first step 608 in the flow diagram 600, the SMC sends a request to the MSMS. At step 610, the MSMS accepts the request from the SMC and passes the request to step 612 where the MSMS determines which SMS has the requested video file. At step 614 the MSMS selects a specific SMS to satisfy the SMC request. At step 616, the MSMS sends the SMC a redirect to the selected SMS. At step 618, the SMC receives the redirect information from the MSMS.

At step 620, the SMC sends or redirects the request to the selected SMS. Proceeding to step 622, the selected SMS receives the request from the SMC and, at step 624, the selected SMS sends the setup information directly to the SMC and proceeds to step 626 where the SMC receives the setup information from the selected SMS. The selected SMS also sends or streams the requested video file to the SMC at step 628. Finally, at step 630, the SMC receives the requested video file from the selected SMS.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." As used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended, such an intent will be explicitly recited in the claim, and in the absence of such recitation no such limitation is present or intended. For example, in the claims below, when a claim element is described as having "one" feature, it is intended that that element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein as being identical to the interpretation adopted by many courts in the past, notwithstanding any anomalous or precedential case law to the contrary that may be found. Similarly, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, based upon the teachings herein, various modifications, alternative constructions, and equivalents may be used without departing from the invention claimed herein. Consequently, the appended claims encompass within their scope all such changes, modifications, etc. as are within the true spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

The invention claimed is:

1. A distributed streaming media server system, comprising:
  a plurality of streaming media servers that each store a selection of multimedia files;
  a master streaming media server communicatively coupled to the plurality of streaming media servers and that compiles mapping information regarding a location of each of the multimedia files that are stored on each of the plurality of streaming media servers; and
  at least one streaming media client that requests access to a multimedia file through the master streaming media server and receives setup information regarding the requested multimedia file such that the at least one streaming media client can directly access the multimedia file from one of the plurality of streaming media servers,
  wherein the at least one streaming media client receives the setup information from one of the plurality of streaming media servers, and
  wherein the master streaming media server includes a load poll thread, a load average queue, and load average threads to determine the load balancing among the plurality of streaming media servers.

* * * * *